United States Patent [19]

Arima et al.

[11] Patent Number: 5,246,492

[45] Date of Patent: Sep. 21, 1993

[54] PAINT COMPOSITION AND COATING PRODUCT

[75] Inventors: Masamichi Arima; Yoshiyuki Yoneda; Tetsuo Masuno, all of Hiroshima, Japan

[73] Assignee: Nippon Paint Co., Ltd., Osaka, Japan

[21] Appl. No.: 537,653

[22] Filed: Jun. 14, 1990

[30] Foreign Application Priority Data

Jun. 15, 1989 [JP] Japan .................................. 1-153027

[51] Int. Cl.$^5$ ............................................... C09C 1/62
[52] U.S. Cl. .................................... 106/403; 106/404; 106/410; 106/417; 106/418; 156/287.18; 428/450
[58] Field of Search ............... 106/400, 410, 411, 415, 106/417, 418, 287.18, 403, 404; 428/450

[56] References Cited

U.S. PATENT DOCUMENTS

| 3,835,087 | 9/1974 | Searight et al. | 106/417 |
| 4,267,229 | 5/1981 | Knight et al. | 204/245 |
| 4,868,018 | 9/1989 | Schiffer | 428/415 |

FOREIGN PATENT DOCUMENTS 3306400 8/1984 Fed. Rep. of Germany .

Primary Examiner—Mark L. Bell
Assistant Examiner—Deborah Jones
Attorney, Agent, or Firm—Lowe, Price, LeBlanc & Becker

[57] ABSTRACT

The present invention provides a paint composition which contains a non-glorious color pigment and a scaly glorious color pigment, wherein both the contained non-glorious color pigment and scaly glorious color pigment are selected so as not to be similar colors.

17 Claims, 1 Drawing Sheet

PAINT COMPOSITION AND COATING PRODUCT

BACKGROUND OF THE INVENTION

The present invention relates to a paint composition and a coating product.

There is a paint composition which contains a non-glorious color pigment and a scaly glorious color pigment. When a coating film is made by using this paint composition, a design effect is displayed due to the gloss action of the glorious pigment. More concretely, there is a paint composition in which a blue-interfacing mica (a scaly glorious color pigment) is in combined use with a non-glorious blue pigment.

However, since displaying of higher design effects is recently desired in various kinds of coating products (for example, automobile paints), known paint compositions have difficulty in sufficiently responding to the desire.

SUMMARY OF THE INVENTION

According to these circumstances, the first object of the present invention is to provide a paint composition capable of forming a coating film, in which both a gloss action of the scaly glorious color pigment and a color action of the non-glorious color pigment are sufficiently displayed, a wide variety of color tones and hues are seen, and high design performance is thus exhibited. The second object is to provide a coating products, wherein a coating film sufficiently displaying both the gloss action of the scaly glorious color pigment and the color action of the non-glorious color pigment, shows a wide variety of color tones and hues, and thus exhibits high design performance when formed on a substrate material surface.

In order to solve the first object, in a paint composition, both the contained non-glorious (or luster-less, hereinafter the word "non-glorious" is used in the same meaning) color pigment and scaly glorious (or brilliant, hereinafter the word "glorious" is used in the same meaning) color pigment are selected so as not to be similar colors.

To solve the second object, in a coating product, the non-glorious color pigment and scaly glorious color pigment which are contained in a coating film being formed on the substrate material surface are selected so as not to be similar colors.

DESCRIPTION OF THE INVENTION

Figure 1:
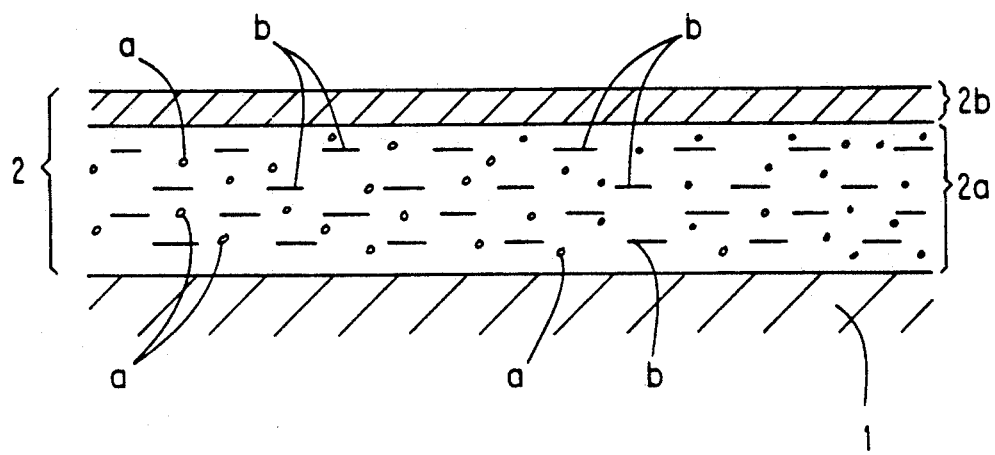
FIGS. 1, 2 and 3 are typical section views showing construction of the examples of coating products according to the present invention.

For paint compositions according to the present invention, there are combined not only non-glorious color pigments and scaly glorious color pigments, but also resins, additives, solvents and so on, which are properly selected and usually contained in a paint in proper quantity.

Examples of scaly glorious color pigments used according to the present invention include color-interfering mica powder, colored mica powder, colored aluminum powder, colored bronze powder, and colored stainless-steel powder. These pigments are scaly particles having a diameter in a range of 4 to 50 μm.

The color-interfering mica is covered on the surface of mica slices with titanium dioxide of large refractive index and shows a brilliance which is in a region of yellow to green depending upon the thickness of titanium dioxide. This color-interfering mica is produced as follows. At first, fine mica-slices are suspended in water, in which titanium sulfate or titanium tetrachloride is hydrolyzed, and thus-formed fine particles of titanium dioxide hydrate are attached on the surface of mica slices. Washing and drying followed by baking at a temperature of 800° to 900 ° C. form a thin film of titanium dioxide, which results in the formation of the color-interfering mica. In addition, there is a color-interfering mica in which the surface of titanium dioxide is further covered with iron oxide and thus has a brilliance in a region of gold to red-copper color.

The colored mica is a scaly glorious color pigment in which the surface of mica slices is covered with a colorant, for example, iron oxide, and thus shows a brilliance which is in a region of red to bronze color.

For example of the colored aluminum powder, the colored bronze power, and the colored stainless-steel powder, the respective metal slices are colored by a usual pigment, for example, a pigment in a group of quinacridone, one in a group of perylene, one in a group of phthalocyanine, one in a group of indanthrone, and one in a group of iron oxide.

Examples of non-glorious color pigment used in the present invention include pigments which are used for a paint composition for coating automobile bodies. Such pigments include Cyanine Blue-G . 500 N, Cyanine Blue-G . 314, Cyanine Blue-MR-3, Cinquasia Gold YT-915 D, Irgazin Yellow 2RLT/3R; Paliotol Yellow 2140HD, Sicotrans Yellow L-1916, Degussa Carbon FW . 200B, Lionogen Red YF, Cinquasia Magenta B-RT-343D, Perrindo Maroon R . 6424/R 6436, Paliogen Maroon 3920, Transparent Iron Oxide Red 30-1005, Irgazin Red DPP-BO, Lionol Green 6YKP-N, Fastogen Blue 6020, Paliogen Blue L-6480, and the like. Usually, pigments having an average particle diameter of about 0.03 to 0.3 μm are used. According to one embodiment of the present invention, plural pigments are in combined use. For example, to adjust a color tone, a black color pigment such as Degussa Carbon FW . 200 B may be properly used in combination with the non-glorious yellow, blue or red pigment.

Preferably, the total contents of the non-glorious color pigment and the scaly glorious color pigment is in a range of 1.1 to 65 weight parts against 100 weight parts of the solid portion of a paint composition (or a coating film) and more preferably in a range of 2 to 40 weight parts. If the contents exceeds the 65 weight parts, sufficient coating film gloss and weather resistance are difficult to achieve. If the contents are below the 1.1 weight parts, sufficient hiding is difficult to achieve.

Preferably, the contents of the non-glorious color pigment is in a range of 1 to 40 weight parts against 100 weight parts of a solid portion of the paint composition (or coating film) and more preferably, does not exceed the 30 weight parts. If the contents of the non-glorious color pigments exceeds 40 weight parts, sufficient gloss and weather resistance are difficult to achieve. If the contents of the non-glorious color pigment is below 1 weight part, sufficient coloring and hiding are difficult to achieve.

Preferably, the contents of the scaly glorious color pigment is in a range of 0.1 to 25 weight parts against 100 weight parts of a solid portion of the paint composition and more preferably in a range of 1 to 20 weight parts. If the contents of the scaly glorious color pigment exceeds 25 weight parts, sufficient gloss and weather resistance are difficult to achieve. If the contents of the scaly glorious color pigment is below 0.1 weight part, sufficient gloss is difficult to achieve.

The non-glorious color pigment and the scaly glorious color pigment are selected so as not to be similar colors or similar hues. For example, the non-glorious color pigment and the scaly glorious color pigment are at least two different colors selected from the group of red, yellow, green and blue. In this case, combination of both the pigments in a complementary color relation or a nearly complementary color is preferred, because the color difference between both the pigments are obviously recognized. Examples of the color combination of both the pigments are shown below. Needless to say, there are also gold glorious color pigments (the gold color may be regarded as a glorious color in a yellow system).

In a case wherein the non-glorious color is red, the glorious color is green.

In a case wherein the non-glorious color is blue, the glorious color is yellow.

In a case wherein the non-glorious color is yellow, the glorious color is blue.

In a case wherein the non-glorious color is green, the glorious color is red.

The scaly glorious color pigment in the present invention does not include a scaly glorious white-color pigment (a scaly glorious uncolored pigment). In the case wherein a glorious white pigment is used, unevenness in a coating film causes color tone variation which always appears on the coating film surface. The uneven parts are seen as a different tone and so appears unsightly. It is very difficult to make a coating film of uniform thickness, with which the unevenness effect does not appear and, therefore, there is indeed no practical use for a coating composition in which the scaly glorious pigment has a white glorious color.

The coating product as shown in FIG. 1 is settled with a coating film 2 on a substrate material 1. The coating film 2 consists of a paint layer 2a containing both a non-glorious color pigment a and a scaly glorious color pigment b as well as a clear layer (a transparent layer) 2b. The paint layer 2a is composed of a paint composition in which the non-glorious color pigment and the scaly glorious pigment are selected so as not to be similar colors.

Figure 2:
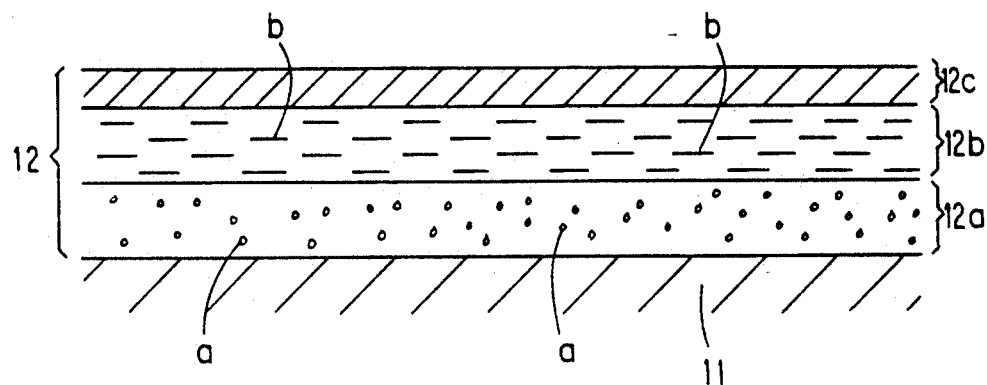

The coating product as shown in FIG. 2 is settled with a coating film 12 consisting of three paint layers 12a, 12b and 12c on a substrate material 11. The paint layers 12a, 12b and 12c are formed by making the layers in sequence from the lowest layer. The paint layer 12a contains a non-glorious color pigment a, the paint layer 12b contains a scaly glorious color pigment b, and the paint layer 12c is a clear layer.

Figure 3:
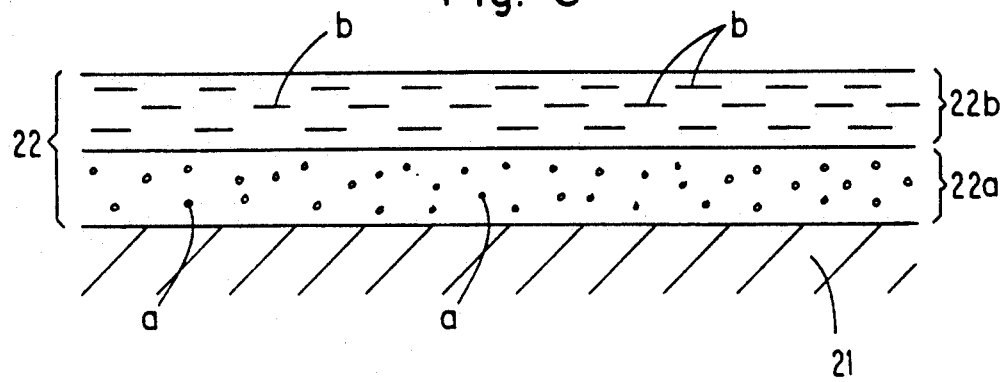

The coating product as shown in FIG. 3 is settled with a coating film 22 consisting of two paint layers 22a and 22b on a substrate material 21. The paint layer 22a contains a non-glorious color pigment 1. The paint layer 22b contains a scaly glorious pigment b and the paint layer 22b is a clear layer.

As shown in FIGS. 1-3, the present invention includes embodiments in which the non-glorious color paint and the scaly glorious color paint are both contained in the same paint layer, and also embodiment in which the respective color paints are separately contained in different layers. Moreover, the coating film may have an under coating and an intermediate coating under the layers 2a, 12a and 22a.

In an example in which the coating product is applied to an automobile body, the coating film formation for this automobile body is performed as follows.

1. A dull steel plate, which is a substrate material, for example, is treated with a zinc phosphate-treating agent (for example, Granodine SD 5000, made by Nippon Paint Co., Ltd.).

2. After surface-treatment is carried out, an under coating layer is formed on a substrate material with cationic electrocoating and, for example, by coating a paint composition in a group of epoxyurethane cationic resins (Power Top u-30, made by Nippon Paint Co., Ltd.).

3. Subsequently, an intermediate coating layer is formed making layers, for example, by coating a paint composition in a group of polyester melamine resins (for example, Orga TO 4820 Grey, made by Nippon Paint Co., Ltd.).

4. On the intermediate coating layer is formed, as a separate layer, a coating film containing components of a non-glorious color pigment and a scaly glorious color pigment in a group of non-similar colors.

5. Finally, a clear layer is formed as a separate layer, for example, by coating a paint composition in a group of acryl melamine resins (Orga TO 4561 Clear, made by Nippon Paint Co., Ltd.).

In the case in which the scaly glorious color pigment and the non-glorious color pigment are not similar colors, the color brilliance of the glorious color pigment is very prominent and the gloss action is remarkable. In previous cases in which the scaly glorious color pigment and the non-glorious color pigment are similar colors, the color brilliance of the glorious color pigment is overlapped with a color of the non-glorious color pigment and is not so prominent.

Since the brilliance extent (a brilliance strength) of the scaly glorious color pigment varies with the viewing angle and the color brilliance becomes more prominent than before as stated above, delicate variation of the brilliance which depends upon an inclining extent of the coated face can be sufficiently recognized. As a result, the color ton e varies in a variety of modes depending upon inclination of the coated face (depending upon the viewing angle) as can be well recognized.

When the color brilliance extent of the scaly glorious color pigment is great, the color of the scaly glorious color pigment is overwhelming on the coating film face. When the brilliance extent of the scaly glorious color pigment is small, the color of the non-glorious color pigment is overwhelming on the coating film face. Because of this, not only the color tone but also the hue vary with variation of the brilliance extent on the coating film face. For example, in a case of a coating film of a wide area, opposite portions have different viewing angles. As the result, there is seen a condition wherein in one portion the glorious color is overwhelming because of the strong brilliance action while in an opposite portion the non-glorious color is overwhelming because of the weak brilliance action. The scaly glorious color pigment and the non-glorious color pigment are not similar colors. Therefore, there coexists different hues on a face of coating films.

Accordingly, a high design effect hitherto unreported is achieved with the coating product of the present invention in which the color tone varies in a variety of modes and the different hues coexist.

PREPARATION OF PAINT COMPOSITION 1

Preparation of First Pigment Solution

In a paint shaker were placed 2.9 parts by weight of a pigment in an indanthrene blue series (Monolight Blue-3R, made by ICI), 24.8 parts by weight of an acryl resin (Arumatex NT-u-64, a resin solid portion 50 weight made by Mitsui Toatsu Kagaku Co., Ltd.), and 17.2 parts by weight of toluene. The resulting mixture was dispersed utilizing glass beads. To the dispersed paste were added 37.4 parts by weight of an acryl resin (Arumatex NT-u-64, a resin solid portion 50 weight %, made by Mitsui Toatsu Kagaku Co., Ltd.), 12.9 parts by weight of a melamine resin (Yuban 20SE-60, a resin solid portion 60 weight %, made by Mitsui Toatsu Kagaku Co., Ltd.), and 3.8 parts by weight of toluene. The resulting mixture was stirred for 30 minutes to obtain the first pigment solution.

Preparation of Second Pigment Solution 13.4 parts by weight of the scaly glorious color pigment (Exteria Marine Bright Gold, made by Maar Corporation) were mixed with 53.8 parts by weight of toluene, 27.2 parts by weight of an acryl resin (Arumatex NT-u-64, made by Mitsui Toatsu Kagaku Co., Ltd.) and 5.6 parts by weight of a melamine resin (Yuban 20SE-60, made by Mitsui Toatsu Kagaku Co., Ltd.). The resulting mixture was stirred for 30 minutes to obtain the second pigment solution. The Exteria Marine Bright Gold used in this example is a pigment exhibiting a glorious color of gold (yellow) and has a particle diameter of about 6 to 48 μm and is obtainable by coating titanium dioxide on mica slices.

Mixing of Pigment Solutions

To 71.7 parts by weight of said first pigment solution was added 28.3 parts by weight of the second pigment solution. The resulting mixture was stirred for 30 minutes to obtain paint composition 1.

PREPARATION OF PAINT COMPOSITION 2

The above procedure for preparing paint composition 1 was repeated except that, as the non-glorious color pigment, a green pigment in a group of phthalocyanine (Rionol Green 6YKP-N, made by Toyo Ink Manufacturing Co., Ltd.) was used and, as a scaly glorious color pigment, Exteria Marine Highlight Red (made by Maar Corporation) was used, whereby a paint composition 2 was obtained. The Exteria Marine Highlight Red used in this example is a pigment exhibiting a glorious color of red and has a particle diameter of about 6 to 48 μm and is obtainable by coating titanium dioxide on mica slices.

PREPARATION OF PAINT COMPOSITION 3

The above procedure for preparing paint composition 1 was repeated except that, as the non-glorious color pigment, a pigment in a group of phthalocyanine blue (Cyanine Blue G-314, made by Sanyo Shikiso Co., Ltd.) was used, whereby a paint composition 3 was obtained.

PREPARATION OF PAINT COMPOSITION FOR COMPARISON

The above procedure for preparing paint composition 1 was repeated except that, as the scaly glorious color pigment, Exteria Marine Highlight Blue (made by Maar Corporation) was used, whereby a paint composition for comparison was obtained. The Exteria Marine Highlight Blue used in this example is a pigment exhibiting a glorious color of blue and has a particle diameter of about 6 to 48 μm and is obtainable by coating titanium dioxide on mica slices.

Combination proportions of each component in the paint compositions 1, 2 and 3 and the pain composition for comparison are presented in Table 1.

TABLE 1

| | | Paint composition 1 | Paint composition 2 | Paint composition 3 | Paint composition for comparison |
|---|---|---|---|---|---|
| Non glorious color pigment | Indanthrene blue (weight parts) | 2.8 | — | — | 2.8 |
| | Phthalocyanine green (weight parts) | — | 2.8 | — | — |
| | Phthalocyanine blue (weight parts) | — | — | 2.8 | — |
| Scaly glorious color pigment (Interfering mica pigment) | Exteria marine bright gold (weight parts) | 3.8 | — | 3.8 | — |
| | Exteria marine highlight red (weight parts) | — | 3.8 | — | — |
| | Exteria marine highlight blue (weight parts) | — | — | — | 3.8 |
| Toluene (weight parts) | | 30.3 | 30.3 | 30.3 | 30.3 |
| Acryl resin varnish of heat-curing type (weight parts) | | 52.3 | 52.3 | 52.3 | 52.3 |
| Melamine resin varnish (weight parts) | | 10.8 | 10.8 | 10.8 | 10.8 |
| Total (weight parts) | | 100.0 | 100.0 | 100.0 | 100.0 |
| Amount of total pigments against 100 weight parts of resin solid portion | | 20.2 PHR | 20.2 PHR | 20.2 PHR | 20.2 PHR |
| Amount of non-glorious pigment against 100 weight parts of resin solid portion | | 8.6 PHR | 8.6 PHR | 8.6 PHR | 8.6 PHR |
| Amount of glorious pigment against 100 weight parts of resin solid portion | | 11.6 PHR | 11.6 PHR | 11.6 PHR | 11.6 PHR |

Next, coating products according to the present invention and a coating product for comparison were produced by using the above paint compositions.

EXAMPLE A

At first, pre-coating and intermediate coating were carried out for a substrate material as described below.

A metal article (500 mm of length, 300 mm of width, and 0.8 mm of thickness), which is a substrate material, was pretreated on the surface as usual with a zinc phosphate-treating agent (Granodine SD 5000, made by Nippon Paint Co., Ltd.) and electrocoated as usual with a cationic electrocoating paint (Power Top-u-30 in a group of epoxyurethane resins, made by Nippon Paint Co., Ltd.), whereby an electrocoated paint film (an under coating layer) having a dried film of 20 μm thickness is formed. Next, a paint for intermediate coating (Orga T04820 Grey in a group of polyester-melamine resins, made by Nippon Paint Co., Ltd.) was applied as usual, whereby an intermediate layer having a dried film of 35 μm thickness was formed.

Subsequently, the paint composition 1 was diluted with a thinner for coating (Orga T0520c, made by Nippon Paint Co., Ltd.) (13 seconds at 20° C. by #4 Ford cup) and electrostatic spray-coating was carried out by using a spraying gun (made by Japan Ransburg Kabushiki Kaisha, REA, nozzle cap No. 6) (the spraying was carried out twice having 1 minute of flashing-off time between the first and second spraying), whereby a coating film was formed (15 μm when converted into dried thickness). Then, on wet-on-wet a clear paint (Orga TO 4561 Clear in a group of acryl-melamine resins, made by Nippon Paint Co., Ltd.) was applied and baked at 140° C. for 20 minutes, whereby a coating product was obtained. Thickness of the whole coating film on the substrate material was about 110 μm.

EXAMPLE B

The procedure of example A was repeated except that the paint composition 2 was used instead of the paint composition 1, whereby a coating product was obtained.

EXAMPLE C

The procedure of example A was repeated except that the paint composition 3 was used instead of the paint composition 1, whereby a coating product was obtained.

EXAMPLE D

The procedure of example A was repeated except that the undermentioned paint composition a and then the paint composition b were coated instead of the paint composition 1, whereby a coating product was obtained. In this coating product, a paint layer containing a non-glorious color pigment was formed by paint composition a, on which a paint layer containing a scaly glorious color pigment was formed by paint composition b, whereby a clear layer was formed.

The Paint Composition a

The first pigment solution used in the preparation of the paint composition 1 was used as paint composition a.

The Paint Composition b

A pigment solution similar to the second pigment solution used in the preparation of the paint composition 1 was used as paint composition b. However, the concentration of the glorious color pigment was set at 6 PHR.

EXAMPLE E

The procedure of example A was repeated except that the undermentioned paint composition c and then the undermentioned paint composition d were coated with care of no formation of a clear layer instead of the paint composition 1, whereby a coating product was obtained. In this coating product, a paint layer containing the non-glorious color paint was formed by paint composition c and a clear paint layer containing the scaly glorious pigment was formed by paint composition d.

The Paint Composition c

The first pigment solution used in said preparation of the paint composition 1 was used as the paint composition c.

The Paint Composition d 0.6 parts by weight of the scaly glorious color pigment, used in said preparation of the paint composition 1 (Exteria Marine Bright Gold, made by Maar Corporation) was mixed with 5.4 parts by weight of toluene. To the resulting mixture was added 72 parts by weight of an acryl resin (Daiale HR . 554, made by Mitsubishi Rayon Co., Ltd.) and 18 parts by weight of a melamine resin (Yuban 20SE-60, made by Mitsui Toatsu Kagaku Co., Ltd.). The resulting mixture was stirred for 30 minutes to obtain paint composition d.

EXAMPLE FOR COMPARISON

The above procedure of example A was repeated except that the paint composition for comparison was used instead of the paint composition 1, whereby a coating product was obtained.

The design effects were evaluated for each coating film obtained from the Examples A, B, C, D and E and the example for comparison. As described below, visual evaluation and evaluation by a deformation color-difference meter were both carried out in order to get a comprehensive judgment.

The Visual Evaluation

A standard light source, a coating product (a coated plate), and a visual position were determined so as the angle of incidence for the standard light and a light-receiving angle by eyes were set at about 60 degrees and then, when the angle of the coating product was varied, the varying hue extent was judged visually.

The Evaluation by a Deformation Color-Difference Meter

Maintaining the light-projecting angle at a constant angle of −45 degrees, when the light-receiving angle was varied between −70 degrees and +70, the evaluation of the chromaticness quantity $C^*$ was determined by the standard formula $C^* = [(aI)^2 + (b^*)^2]^{0.5}$.

Results are presented in Table 2.

TABLE 2

| | Color based on non-glorious pigment | Color based on glorious pigment | Evaluation of design effect |
| --- | --- | --- | --- |
| Example A | Blue | Yellow | ⊚ |
| Example B | Green | Red | ⊚ |
| Example C | Blue | Yellow | ⊚ |
| Example D | Blue | Yellow | ⊚ |
| Example E | Blue | Yellow | ⊚ |
| Example for | Blue | Blue | x |

TABLE 2-continued

| | Color based on non-glorious pigment | Color based on glorious pigment | Evaluation of design effect |
|---|---|---|---|
| comparison | | | |

Evaluation grade
ⓔ ... Excellent
○ ... Good
△ ... Normal
x ... Bad

As mentioned above, a coating film formed by the paint composition of the present invention or a coating film of the coating product according to the present invention has a non-glorious color pigment and a scaly glorious color pigment, both of which are selected so as not to be in a similar color system. The resulting system shows hitherto-unknown variations of color tone and hue on the coating film face, and thus, a high design effect is displayed.

What is claimed is:

1. A paint composition comprising about 1 to 40 parts by weight of a luster-less color pigment, about 0.1 to 25 parts by weight of a scaly brilliant color pigment selected from the group consisting of color-interfering mica powder, colored mica powder, colored aluminum powder, colored bronze powder, colored stainless steel powder and mixtures thereof, and a resin base, said scaly brilliant color pigment and said luster-less color pigment being non-similar colors.

2. A paint composition according to claim 1, wherein said scaly brilliant color pigment comprises particles having a diameter in the range of 4 to 50 μm.

3. A paint composition according to claim 1, wherein said scaly brilliant color pigment consists of titanium dioxide coated mica.

4. A paint composition according to claim 1, wherein said scaly brilliant color pigment consists of titanium dioxide coated mica which is further coated with iron oxide.

5. A paint composition according to claim 3, wherein said colored aluminum powder, colored bronze powder and colored stainless steel powder are respectively an aluminum powder, a bronze powder and a stainless steel powder which are coated with a member selected from the group consisting of quinacridone, perylene, phthalocyanine, indanthrone and iron oxide.

6. A paint composition according to claim 1, wherein said luster-less color pigment is selected from the group consisting o Cyanine Blue-G 500 N, Cyanine Blue-G 314, Cyanine Blue-MR-3, Cinquasia Gold YT-915 D, Irgazin Yellow 2RLT/3R, Paliotol Yellow 2140HD, Sicotrans Yellow L-1916, Degussa Carbon FW 200B, Lionogen Red YF, Cinquasia Magenta B-RT-343D, Perrindo Maroon R 6424/R 6436, Paliogen Maroon 3920, Transparent Iron Oxide Red 30-1005, Irgazin Red DPP-BO, Lionol Green 6YKP-N, Fastogen Blue 6020, Paliogen Blue L-6480 and mixtures thereof.

7. A paint composition according to claim 6, wherein said luster-less color pigment comprises particles having a diameter in the range of about 0.03 to 0.3 μm.

8. A paint composition according to claim 3, wherein said non-similar colors are selected from the group consisting of red, yellow, green and blue.

9. A coated article comprising a substrate having a film coating thereon, wherein said film coating contains about 1 to 40 parts by weight of a luster-less color pigment, about 0.1 to 25 parts by weight of a scaly brilliant color pigment selected from the group consisting of color-interfering mica powder, colored mica powder, colored aluminum powder, colored bronze powder, colored stainless steel powder and mixtures thereof, and a resin base, said scaly brilliant color pigment and said luster-less color pigment being non-similar colors.

10. A coated article according to claim 9, wherein said scaly brilliant color pigment comprises particles having a diameter in the range of 4 to 50 μm.

11. A coated article according to claim 9, wherein said scaly brilliant color pigment consists of titanium dioxide coated mica.

12. A coated article according to claim 9, wherein said scaly brilliant color pigment consists of titanium dioxide coated mica which is further coated with iron oxide.

13. A coated article according to claim 9, wherein said scaly brilliant color pigment is a member selected from the group consisting of colored aluminum power, colored bronze powder and colored stainless steel powder, which is coated with a member selected from the group consisting of quinacridone, perylene, phthalocyanine, indanthrone and iron oxide.

14. A coated article according to claim 9, wherein said luster-less color pigment is selected from the group consisting of Cyanine Blue-G 500 N, Cyanine Blue-G 314, Cyanine Blue-MR-3, Cinquasia Gold YT-915 D, Irgazin Yellow 2RLT/3R, Paliotol Yellow 2140HD, Sicotrans Yellow L-1916, Degussa Carbo FW 200B, Lionogen Red YF, Cionquasia Magenta B-RT-343D, Perrindo Maroon R 6424/R 6436, Paliogen Maroon 3920, Transparent Iron Oxide Red 30-1005, Irgazin Red DPP-BO, Lionol Green 6YKP-N, Fastogen Blue 6020, Paliogen Blue L-6480 and mixtures thereof.

15. A coated article according to claim 14, wherein said luster-less color pigment comprises particles having a diameter in the range of about 0.03 to 0.3 μm.

16. A coated article according to claim 9, wherein said scaly brilliant color pigment and said luster-less color pigment are selected so as to have different colors from one another, said colors being selected from the group consisting of red, yellow, green and blue.

17. A coated article according to claim 9, wherein said substrate comprises a metal surface.

* * * * *

UNITED STATES PATENT AND TRADEMARK OFFICE
CERTIFICATE OF CORRECTION

PATENT NO. : 5,246,492
DATED : September 21, 1993
INVENTOR(S) : Masamichi ARIMA et al.

It is certified that error appears in the above-indentified patent and that said Letters Patent is hereby corrected as shown below:

In the Claims:

Column 9, line 42, change "claim 3" to --claim 1--.
Column 10, line 6, change "claim 3" to --claim 1--.

Signed and Sealed this

Twenty-fourth Day of May, 1994

BRUCE LEHMAN

Attest:

Attesting Officer

Commissioner of Patents and Trademarks